(12) United States Patent
Schimmler et al.

(10) Patent No.: US 8,800,927 B2
(45) Date of Patent: Aug. 12, 2014

(54) AIRCRAFT DOOR AND A METHOD FOR THE MANUFACTURE OF AN AIRCRAFT DOOR OF THIS TYPE

(75) Inventors: Marc Schimmler, Himmelpforten (DE); Carsten Paul, Garstedt (DE)

(73) Assignee: Airbus Operations GmbH, Hamburg (DE)

( * ) Notice: Subject to any disclaimer, the term of this patent is extended or adjusted under 35 U.S.C. 154(b) by 444 days.

(21) Appl. No.: 12/769,750

(22) Filed: Apr. 29, 2010

(65) Prior Publication Data
US 2010/0276543 A1 Nov. 4, 2010

Related U.S. Application Data

(60) Provisional application No. 61/173,610, filed on Apr. 29, 2009.

(30) Foreign Application Priority Data

Apr. 29, 2009 (DE) .................. 10 2009 019 434

(51) Int. Cl.
*B64C 1/14* (2006.01)

(52) U.S. Cl.
USPC ...................................... 244/129.5

(58) Field of Classification Search
USPC ............... 244/117 R, 119, 129.4, 129.5
See application file for complete search history.

(56) References Cited

U.S. PATENT DOCUMENTS

| | | | | |
|---|---|---|---|---|
| 3,875,650 | A * | 4/1975 | Jackson | 29/432 |
| 4,576,849 | A * | 3/1986 | Gardiner | 428/119 |
| 4,602,461 | A * | 7/1986 | Cummins et al. | 52/90.1 |
| 4,831,800 | A * | 5/1989 | Nedelcu | 52/223.12 |
| 5,242,523 | A * | 9/1993 | Willden et al. | 156/285 |
| 7,527,222 | B2 * | 5/2009 | Biornstad et al. | 244/120 |
| 2004/0021038 | A1 * | 2/2004 | Solanille et al. | 244/129.5 |
| 2007/0261335 | A1 * | 11/2007 | Powell | 52/293.1 |
| 2011/0315822 | A1 * | 12/2011 | Fairchild | 244/129.5 |

FOREIGN PATENT DOCUMENTS

DE 10046004 A1 12/2001

* cited by examiner

*Primary Examiner* — Valentina Xavier
(74) *Attorney, Agent, or Firm* — Leydig, Voit & Mayer, Ltd.

(57) ABSTRACT

An aircraft door includes an outer skin configured as a panel structure; and a rear body structure configured as an integral cast structure and operatively connected to the panel structure so as to provide rigidity.

12 Claims, 4 Drawing Sheets

AIRCRAFT DOOR AND A METHOD FOR THE MANUFACTURE OF AN AIRCRAFT DOOR OF THIS TYPE

Priority is claimed to German Application No. DE 10 2009 019 434.7, filed Apr. 29, 2009 and U.S. Provisional Application No. 61/173,610, filed Apr. 29, 2009, the entire disclosure of both applications is incorporated by reference herein.

BACKGROUND

An aircraft door consists essentially of an outer skin, which in the closed state of the aircraft door is matched to the surface contour of the fuselage, and also a rear body structure, which is connected with the outer skin and gives the latter the necessary rigidity. This structure is also provided for doors designed as hatches, which are arranged without hinge units in a frame fitted to the fuselage, and are closed in normal operation of the aircraft, so that for reasons of simplification the term aircraft door or door also includes hatches of this type, in particular emergency evacuation hatches and access hatches, which enable an emergency evacuation or provide access for maintenance tasks.

Emergency evacuation hatches are inserted into the frame from the interior and are locked by means of a locking mechanism. In an emergency situation the hatch can be unlocked and lifted out of the frame into the interior of the aircraft; it is then thrown sideways out of the aircraft through the opening created so as to clear an emergency route, onto the wing, for example. A window ensures that the operator can detect any risks outside the aircraft fuselage, such as fire, obstacles, and similar, and if necessary leaves the hatch closed.

At the present time it is usual to manufacture aircraft doors of this type in a differential form of construction by means of a riveting and/or adhesive technique with a multiplicity of differing production steps. One production step includes the manufacture of the rear body structure, wherein beam and frame elements are joined together by means of overlaps and ancillary brackets to create a framework. In a method of known art the outer skin, designed as a skin panel, is subsequently connected with the rear body structure, in particular by means of riveting. Here the production resource requirement is significant, since for the manufacture of the rear body structure a large number of individual components and connecting elements is required. Also it is disadvantageous that overlaps and ancillary brackets are necessary for the joining of the individual components in the connecting regions. In addition to high assembly costs this requires an increased structural weight overall.

In addition to the differential form of construction it is furthermore of known art, to manufacture aircraft doors in a single piece, integral form of construction by means of a casting and/or milling technique. From DE 100 46 004 A1 an aircraft door is of known art in which the rear body structure and outer skin are designed in one piece using a sand casting method. This solution has, however, the disadvantage that the moulding tools required have a complex structure and the outer skin can only be cast with a high minimum thickness, so that the door of this type either has a high structural weight or by virtue of the finish machining of the skin field using milling technology is extremely resource intensive in production engineering terms.

SUMMARY OF THE INVENTION

In contrast an aspect of the present invention is to create a high-strength aircraft door that has a reduced structural weight and can be manufactured with minimal production engineering resource.

The aircraft door according to the invention is provided with an outer skin designed as a panel structure, to which is assigned a rear body structure for purposes of rigidity. In accordance with the invention the rear body structure is designed as an integral cast structure. Compared with DE 100 46 004 A1 the moulding tools required according to the invention are less complex and the thickness of the outer skin can be freely selected, essentially in accordance with the structural loading. By virtue of the modular design of the rear body structure as an integral cast structure, an aircraft door is achieved which, compared with the prior art, is optimised overall to the loading, which satisfies the high demands on strength in aviation, and compared with conventional structures has a lower structural weight with the same or higher rigidity. In particular when the door is designed as an emergency evacuation hatch a lower structural weight enables easier manipulation of the hatch in the event of an emergency.

In accordance with the invention it has been identified that the aerodynamic contour of the aircraft door can advantageously be achieved by means of a pre-shaped skin panel, which in production engineering terms can be manufactured simply and cost effectively by means of rolling and/or pressing processes. The outer skin is then connected with the rear body structure that has been cast to shape. The rear body structure can advantageously be manufactured with small production tolerances using a sand, precision or pressure casting technique from high-strength light metals and light metal alloys that are suitable for casting, such as, for example, aluminium, magnesium and/or titanium alloys. In the case of aircraft doors with a window frame the latter is advantageously cast into the rear body structure, so that in this regard further production stages can be eliminated.

In accordance with a particularly preferred example of embodiment of the invention the rear body structure has integrally designed beams and/or frames. The stiffening elements of the rear body structure are preferably arranged and dimensioned as a function of the structural loading, so that overall a light structure is achieved with a high rigidity.

It has been found to be advantageous, if at least two central frames are provided, which are continuously formed and extend over the whole length of the door. As used herein, the at least two central frames extending over the whole length of the door means the at least two central frames essentially extending over the whole length of the door. By this means a homogenous force distribution is achieved with a reduced structural weight for the aircraft door.

In a preferred example of embodiment of the invention the two frames have a web extending at right-angles to the outer skin, with flanges running at right-angles to the web, so that overall a light structure is achieved with a high rigidity. As used herein, extending at right-angles means extending at approximately right angles, and running at right-angles means running at approximately right-angles. The flanges facing away from the outer skin are designed as T-flanges, at least in sections, and are provided for the purpose of connecting a door inner cladding.

In an example of embodiment according to the invention the two central frames are designed in accordance with the structural loading to be curved in an arced shape relative to the longitudinal axis of the door. Here it has been found to be advantageous if the frames are designed to be curved such that these are spaced apart matched to the geometry of the window opening. By this means a homogenous force distribution is achieved in the region of the window opening.

In a preferred example of embodiment of the aircraft door according to the invention the side of the frames facing away from the outer skin is designed to be curved in an arced shape, at least in sections, in particular in accordance with the structural loading. By this means a further optimisation of the weight of the rear body structure is achieved.

In a concrete example of embodiment of an aircraft door at least one beam has a structural height that reduces from the centre of the door to its edge regions, so that a homogeneous force distribution is made possible. The beams extend essentially parallel to one another and run at right-angles to the frames, so that the beams, together with the frames, form a high-strength box structure.

The side of at least one beam facing away from the outer skin is designed to be curved in a convex arced shape relative to the outer skin, preferably in accordance with the structural loading. The beams advantageously form an integral framework structure with cut-outs and/or stiffening webs. By this means a further optimisation of the weight of the rear body structure is made possible with a homogeneous force distribution.

In the region of the door frame the aircraft door can be provided with a peripheral edge beam, which has a web extending approximately at right-angles to the outer skin, and a flange running approximately at right-angles to the web. The edge beam of peripheral design forms a further component of the light structure and increases the rigidity of the door in the subsequent region of contact with the door frame of the aircraft fuselage.

In a method for the manufacture of an aircraft door according to the invention the rear body structure is designed in a first step using a casting technique. The panel structure is then provided as an outer skin and connected with the rear body structure.

In production engineering terms it has here been found to be particularly advantageous if the outer skin is connected with the rear body structure by means of a riveting technique. Alternatively or additionally the outer skin can be attached with adhesive to the rear body structure.

BRIEF DESCRIPTION OF THE DRAWINGS

In what follows a preferred example of embodiment of the invention is elucidated in more detail with the aid of schematic drawings. In the figures.

DETAILED DESCRIPTION

In the figures the same design elements have the same reference symbols.

Figure 1:
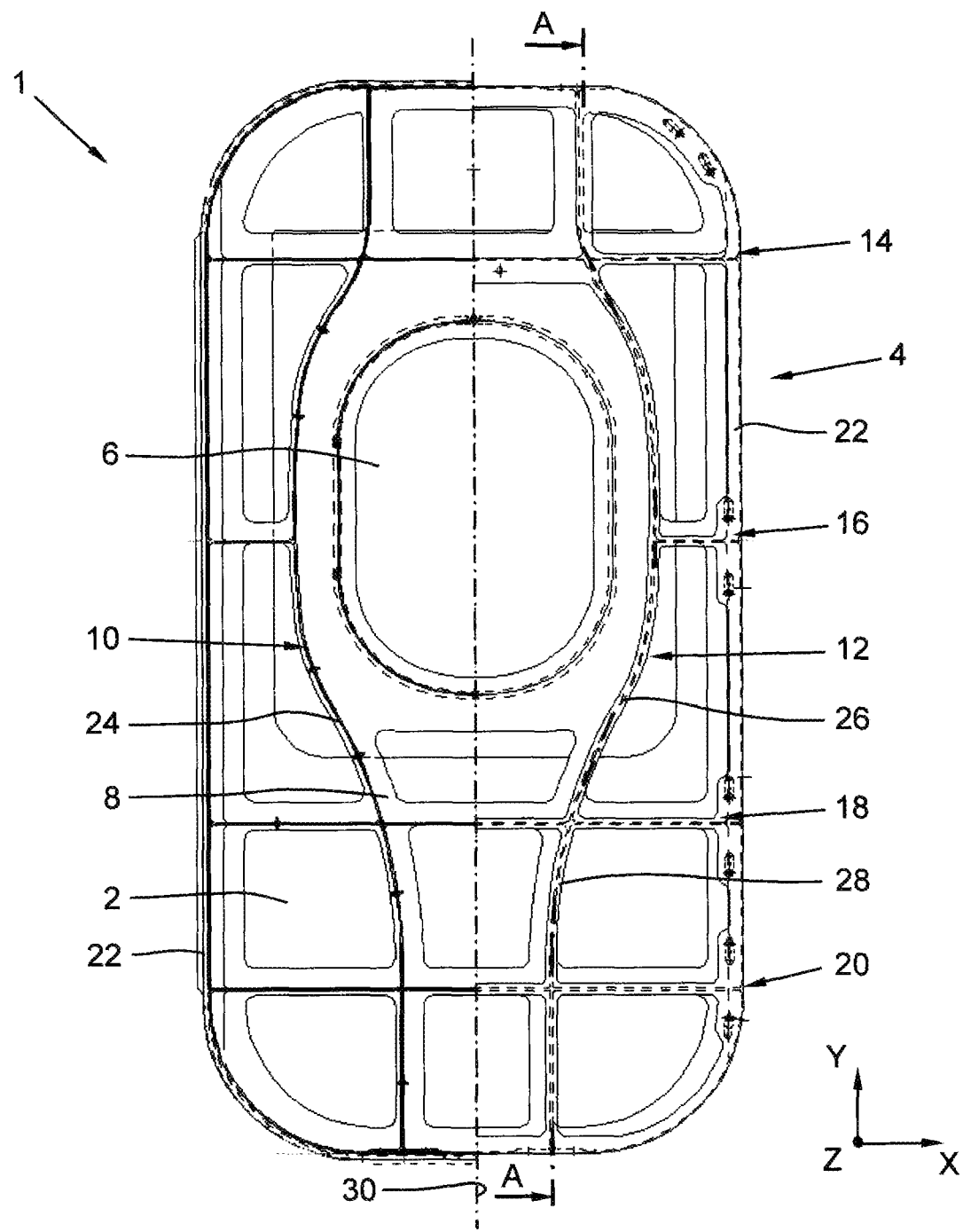
FIG. 1 shows a half section of an aircraft door according to the invention designed as an emergency evacuation hatch.

FIG. 1 shows an aircraft door designed as an emergency evacuation hatch 1, which enables persons to evacuate an aircraft in an emergency. The emergency evacuation hatch 1 is essentially formed from an outer skin 2 designed as a panel structure, which is provided with a rear body structure 4 for rigidity. In accordance with the invention the rear body structure 4 is designed as an integral cast structure, thereby achieving a hatch that is optimised for loading, which has a low structural weight with a high rigidity. The outer skin 2 is connected by means of rivets with the rear body structure 4 such that the inner side of the outer skin 2 is located against the rear body structure 4. A window 6 ensures that the operator of the emergency evacuation hatch 1 can detect hazards outside the aircraft, such as fire, obstacles, and similar, and if necessary leaves the hatch 1 closed. A closure mechanism and other additional equipment, not represented, are arranged in the region of the rear body structure 4.

For the manufacture of the hatch 1 the rear body structure 4 has been cast with small production tolerances in a sand casting technique from a high-strength aluminium alloy and then connected with the outer skin 2 provided as a pre-shaped panel structure. In production engineering terms it has been found to be particularly advantageous if the outer skin 2 is connected with connecting sections 8 of the rear body structure 4 by means of rivets. The rear body structure 4 is formed essentially from integrally cast frames 10, 12 and beams 14, 16, 18, 20, 22, wherein according to the example of embodiment of the invention represented two frames 10, 12, four beams 14, 16, 18, 20 and also a peripheral edge beam 22 are provided. In the region of the door frame the hatch 1 is provided with a peripheral edge beam 22, which increases the rigidity of the hatch 1 in the subsequent region of contact with the door frame of the aircraft fuselage. The beams 14, 16, 18, 20 extend in the fuselage longitudinal direction X and in the radial direction Y are spaced apart, parallel to one another. The beams 14, 16, 18, 20 are arranged over the whole width of the hatch 1 and at their end sections, i.e. in the edge region of the hatch, are connected with the peripheral edge beam 22. The two frames 10, 12 extend essentially in the radial direction Y of the fuselage and are spaced apart from one another in the fuselage longitudinal direction X. The end sections of the frames 10, 12 are likewise connected with the edge beam 22.

The two frames respectively formers 10, 12 are in each case continuously formed and extend essentially over the whole length of the hatch 1. The frames 10, 12 have, in each case a web, 24 and 26 respectively, extending approximately at right-angles to the outer skin 2, with flanges running approximately at right-angles to the webs. The flanges 28 facing away from the outer skin 2 are designed in sections as T-flanges and are provided for the purpose of connecting a door inner cladding, not represented. The frames 10, 12 are connected with the four beams 14, 16, 18, 20 running transverse to the frames. The integrally designed beams 14, 16, 18, 20, 22 and frames 10, 12 are arranged and dimensioned as a function of the structural loading such that overall a light emergency evacuation hatch is achieved with a high rigidity. It has been found to be particularly advantageous if the two central frames 10, 12, as represented in FIG. 1, are designed in accordance with the loading to be curved in an arced shape relative to a longitudinal axis 30 of the hatch 1, wherein the frames 10, 12 are designed to be curved such that these are spaced apart, matched to the geometry of the window opening. By this means a homogeneous force distribution is achieved in the region of the window opening 6.

Figure 2:
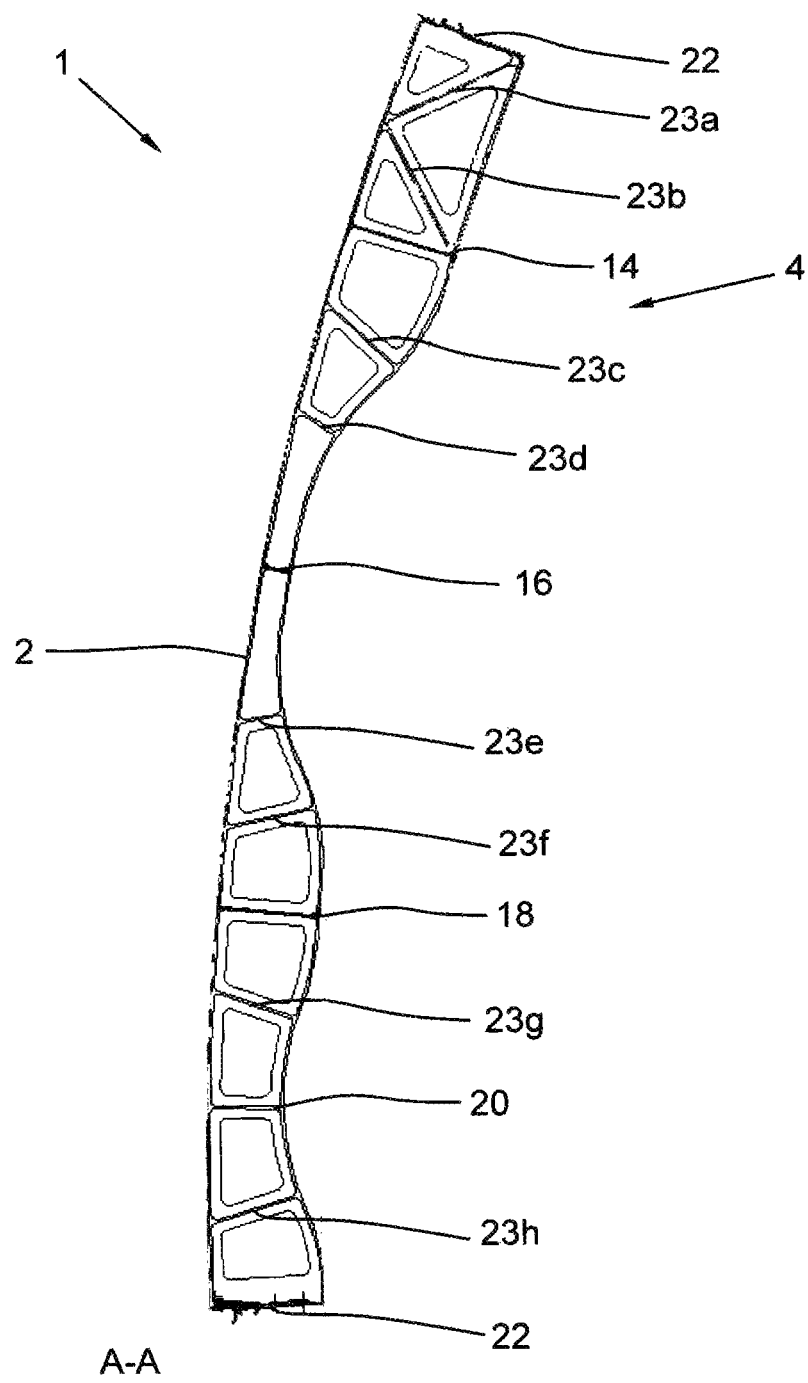
FIG. 2 shows a sectional representation of the emergency evacuation hatch from FIG. 1 along the line A-A.

As can be seen from FIG. 2, which shows a sectional representation of the emergency evacuation hatch 1 from FIG. 1 along the line A-A, the emergency evacuation hatch is curved in a convex manner corresponding to the radius of curvature of the aircraft fuselage. The sides of the frames 10, 12 facing away from the outer skin 2 are designed in sections in accordance with the structural loading curved in a multiply-arced shape, wherein between the beams 14, 16, 18, 20, 22, stiffening ribs 23a-h are in each case designed on the frames 10, 12, which extend between the outer side and inner side of the rear body structure. By this means a further optimisation of the weight of the rear body structure 4 is achieved with a high rigidity. In the example of embodiment of the invention represented the frames 10, 12 are provided with a reduced web height in the region of the window opening 6 and in a region underneath the window opening 6. In what follows this is elucidated in more detail with the aid of FIGS. 3 to 6, which in each case show sectional representations of the emergency evacuation hatch 1 in the region of the beams 14, 16, 18, 20.

Figure 3:
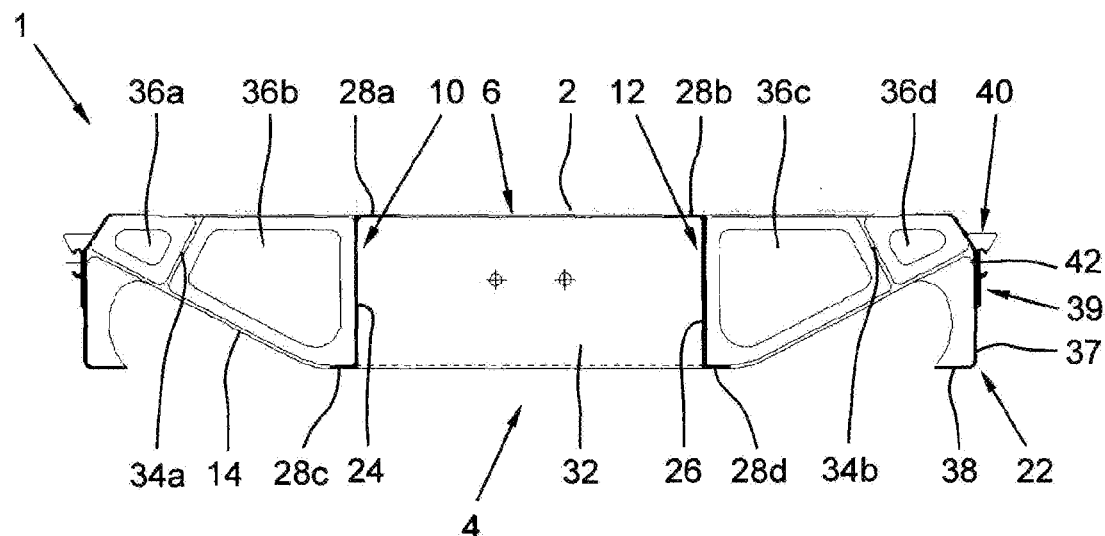
FIG. 3 shows a sectional representation of the emergency evacuation hatch in the region of the upper beam.

According to FIG. 3, which shows a sectional representation of the emergency evacuation hatch 1 in the region of the upper beam 14, the latter has a central web region with an approximately rectangular cross-section, which is bounded on both sides by the frames 10, 12. The frames 10, 12 are provided in this region with flanges 28a-d arranged displaced relative to one another, wherein the flanges 28a-d in the connecting region of the outer skin 2 are directed inwards with reference to the longitudinal axis 30 (see FIG. 1), and in the connecting region of the inner cladding are directed outwards. The beam 14 has a structural height that in each case starting from the frames 10, 12 reduces towards the peripheral edge beam 22, so that a homogeneous force distribution is made possible. In the region between the frames 10, 12 and the peripheral edge beam 22 the beam 14 is provided with an integral framework structure of stiffening webs 34a, 34b and cut-outs 36a-d, wherein in each case a stiffening web 34a, 34b is provided that extends approximately at right-angles to the fuselage inner side of the beam 14. The edge beam 22 has a web 37 extending approximately at right-angles to the outer skin 2, and a flange 38 running approximately at right-angles to the web. On the side of the edge beam 22 a contact profile 39 is integrated into the cast structure, which via a bearing surface 40 extending approximately parallel to the outer skin surface can be brought into contact with the door frame and has a seating 42 for the door seal.

Figure 4:
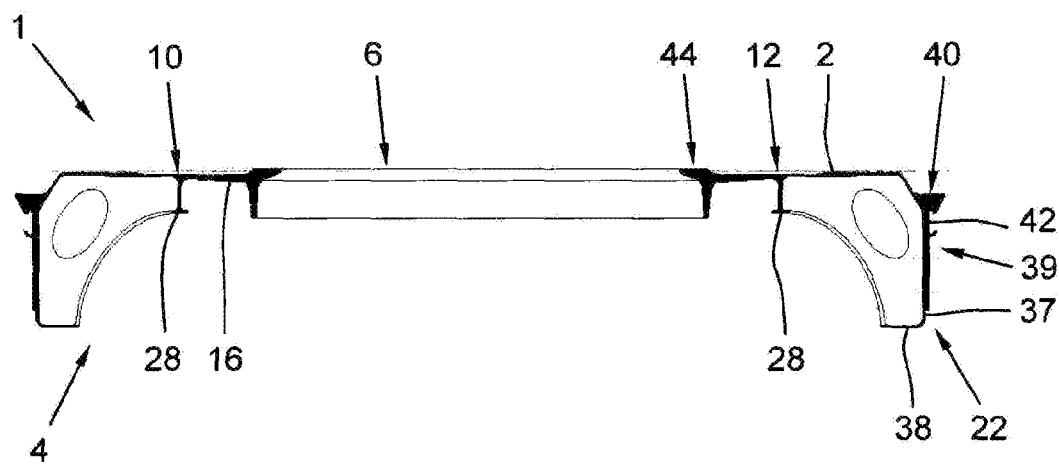
FIG. 4 shows a sectional representation of the emergency evacuation hatch in the region of the beam provided in the window region.

FIG. 4 shows a sectional representation of the emergency evacuation hatch 1 in the region of the beam 16 provided in the window region, according to which a window frame 44 of the window 6 is already integrated into the rear body structure 4, i.e. has been cast into the latter, so that in this regard further production stages can be eliminated. The frames 10, 12 are designed as T-beams with a relatively small web height, since in this region the window frame 44 is provided as an additional load-bearing structure.

Figure 5:
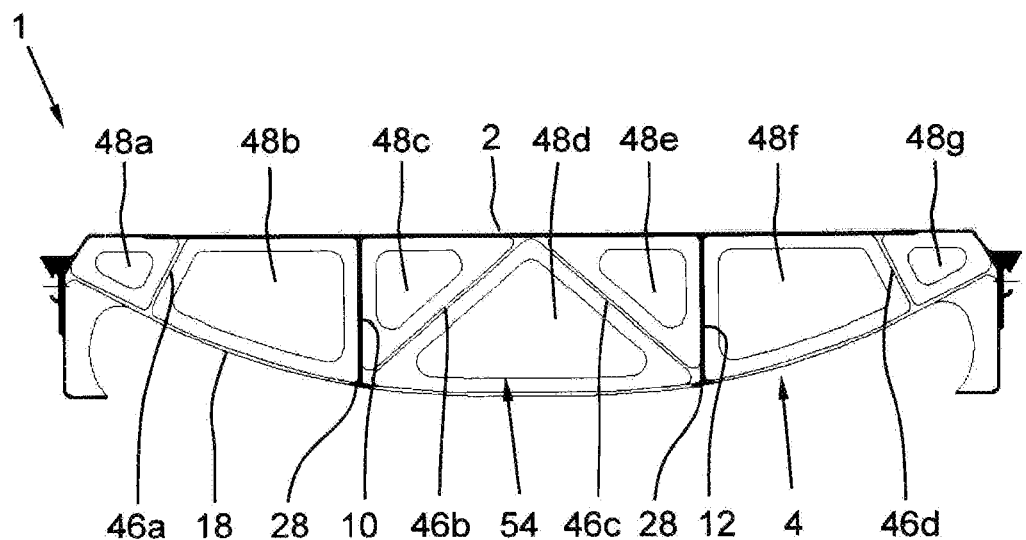
FIG. 5 shows a sectional representation of the emergency evacuation hatch in the region of the beam arranged under the window.

As can be seen from FIG. 5, which shows a sectional representation of the emergency evacuation hatch 1 in the region of the beam 18 arranged under the window frame 44 (see FIG. 1), the beam 18 has a structural height that starting from the centre of the hatch reduces towards its edge regions. The side of the beam 18 facing away from the outer skin 2 is designed to be curved in a convex arced shape relative to the outer skin, in accordance with the structural loading. The beam 18 is provided with an integral framework structure of stiffening webs 46a-d, and cut-outs 48a-g, wherein in a central region 54 between the frames 10, 12 two diagonally running stiffening webs 46b, 46c are provided such that a triangular framework structure is formed. The stiffening webs 46b, 46c extend from a skin-side central region of the structure 4 to the interior-side end sections of the frames 10, 12. By this means a further optimisation of the weight of the rear body structure 4 is achieved with a high rigidity.

Figure 6:
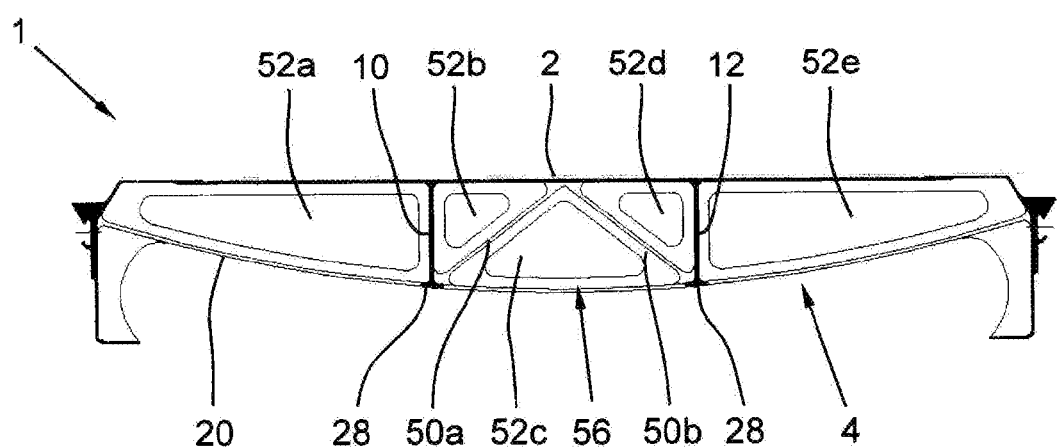
FIG. 6 shows a sectional representation of the emergency evacuation hatch in the region of the lower beam.

FIG. 6 shows a sectional representation of the emergency evacuation hatch in the region of the lower beam 20. The side of the beam 20 facing away from the outer skin 2 is designed to be curved in a convex arced shape relative to the outer skin 2, in accordance with the structural loading, wherein the maximum web height of the beam 20 is reduced compared with the beam 18 represented in FIG. 5. The beam 20 is provided with an integral framework structure of stiffening webs 50a, 50b, and cut-outs 52a-e, wherein in a central region 56 between the frames 10, 12 two diagonally running stiffening webs 50a, 50b, are provided such that a homogeneous force distribution is made possible with a high rigidity. The stiffening webs 50a, 50b extend from a skin-side central region of the structure 4 to the interior-side end sections of the frames 10, 12.

The aircraft door according to the invention is not limited to the emergency evacuation hatch 1 as described, rather the aircraft door according to the invention can be designed in the form of an alternative, not represented, example of embodiment as a freight door, an access hatch, or similar, with an outer skin 2, which is connected with a rear body structure 4 designed as an integral cast structure.

Disclosed is an aircraft door 1 with an outer skin 2 designed as a panel structure, to which is assigned a rear body structure for purposes of rigidity, wherein according to the invention the rear body structure 4 is designed as an integral cast structure; also disclosed is a method for the manufacture of an aircraft door of this type.

REFERENCE SYMBOL LIST

1 Emergency evacuation hatch
2 Outer skin
4 Rear body structure
6 Window
8 Connecting sections
10 Frame/Former
12 Frame/Former
14 Beam
16 Beam
18 Beam
20 Beam
22 Edge beam
23 Stiffening rib
24 Web
26 Web
28 Flange
30 Longitudinal axis
32 Web region
34 Stiffening web
36 Cut-out
37 Web
38 Flange
39 Contact profile
40 Bearing surface
42 Seating
44 Window frame
46 Stiffening webs
48 Cut-out
50 Stiffening webs
52 Cut-out
54 Central region
56 Central region

What is claimed is:
1. An aircraft door, comprising:
an outer skin configured as a panel structure; and
a rear body structure configured as an integral cast structure and operatively connected to the panel structure so as to provide rigidity, the rear body structure including at least two central frames extending over an entire length of the aircraft door, the at least two central frames being curved in an arched shape relative to a longitudinal axis of the aircraft door from a perspective orthogonal to the outer skin so as to extend around a window opening in the aircraft door.

2. The aircraft door as recited in claim 1, wherein the rear body structure includes at least one beam portion extending across a width of the aircraft door.

3. The aircraft door as recited in claim 1, wherein the rear body structure comprises an outer side attached to the outer skin and an inner side opposite the outer skin, and wherein each of the central frames includes:
   a web extending transverse to the outer skin from the outer side to the inner side, and
   at least one flange disposed transverse to the web on the inner side of the rear body structure.

4. The aircraft door as recited in claim 1, wherein each of the central frames includes a side facing away from the outer skin that includes at least one section curved in an arc shape.

5. The aircraft door as recited in claim 4, wherein the at least one section is curved relative to a longitudinal axis of the aircraft door so as to vary a structural height of the central frames along the longitudinal axis of the door.

6. The aircraft door as recited in claim 2, wherein the at least one beam portion includes a plurality of beams, a structural height of the plurality of beams decreasing from a center of the door to edge regions of the door.

7. The aircraft door as recited in claim 2, wherein a side of the at least one beam portion facing away from the outer skin includes at least one section curved in a convex arc shape.

8. The aircraft door as recited in claim 7, wherein the side of the at least one beam portion is curved in a manner configured to withstand a structural loading.

9. The aircraft door as recited in claim 1, wherein the rear body structure includes an integral framework structure including a plurality of stiffening webs.

10. The aircraft door as recited in claim 1, wherein the rear body structure includes an integral framework structure including a plurality of cutouts.

11. A method for manufacturing an aircraft door, comprising:
   forming a rear body structure using a casting technique;
   the rear body structure including at least two central frames which extend over an entire length of the aircraft door, the at least two central frames being curved in an arched shape relative to a longitudinal axis of the aircraft door from a perspective orthogonal to the outer skin so as to extend around a window opening in the aircraft door; and
   connecting an outer skin configured as a panel structure to the rear body structure.

12. The method as recited in claim 10, wherein the connecting includes connecting the outer skin to the rear body structure using riveting, an adhesive technique, or riveting and an adhesive technique.

\* \* \* \* \*